Jan. 18, 1955   J. D. LAMBERT ET AL   2,699,639
SIDE DELIVERY HAY RAKE
Filed Feb. 25, 1952   2 Sheets-Sheet 1
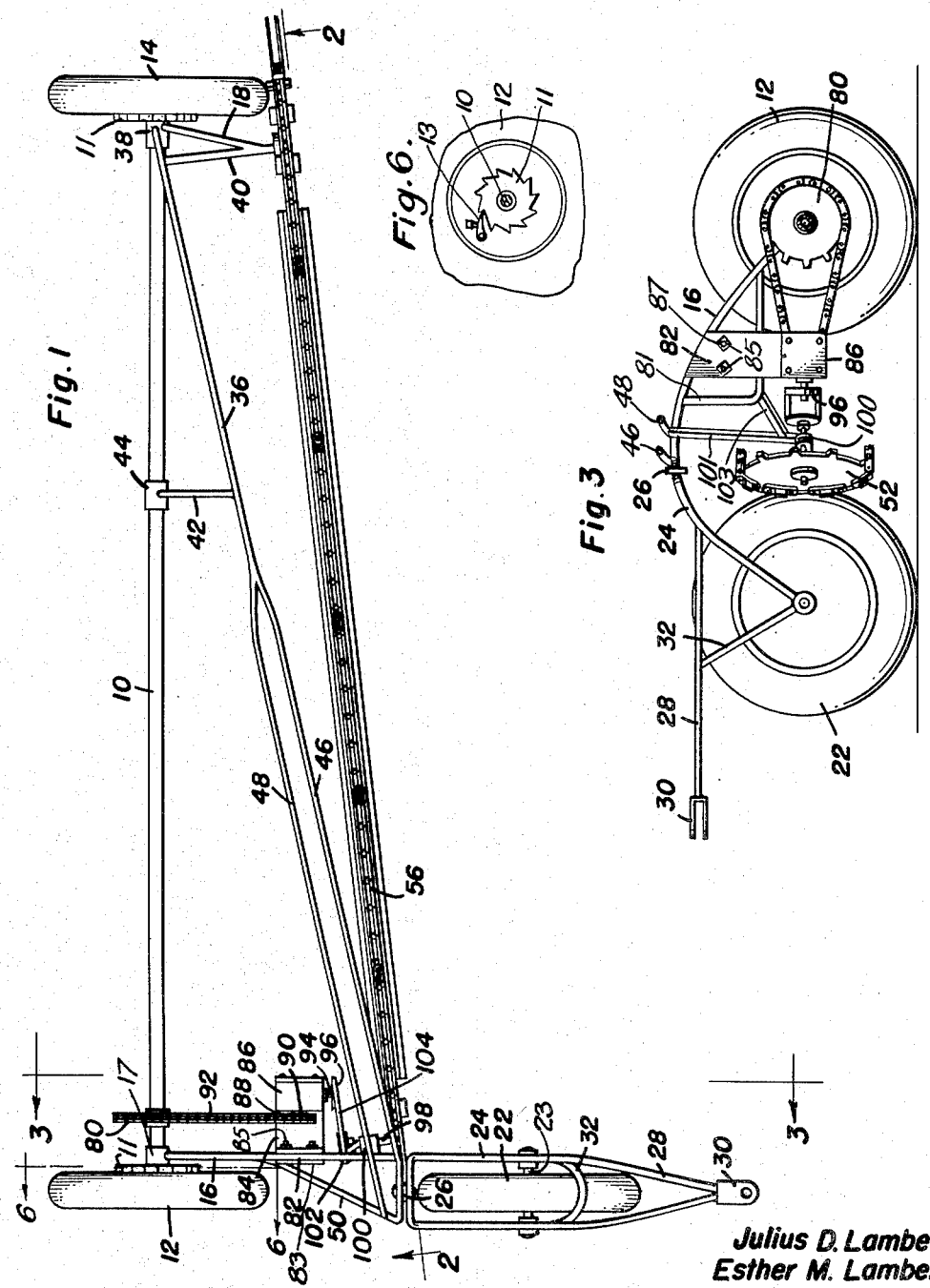
Julius D. Lambert
Esther M. Lambert
INVENTORS.

Jan. 18, 1955                J. D. LAMBERT ET AL                2,699,639
                              SIDE DELIVERY HAY RAKE
Filed Feb. 25, 1952                                             2 Sheets-Sheet 2
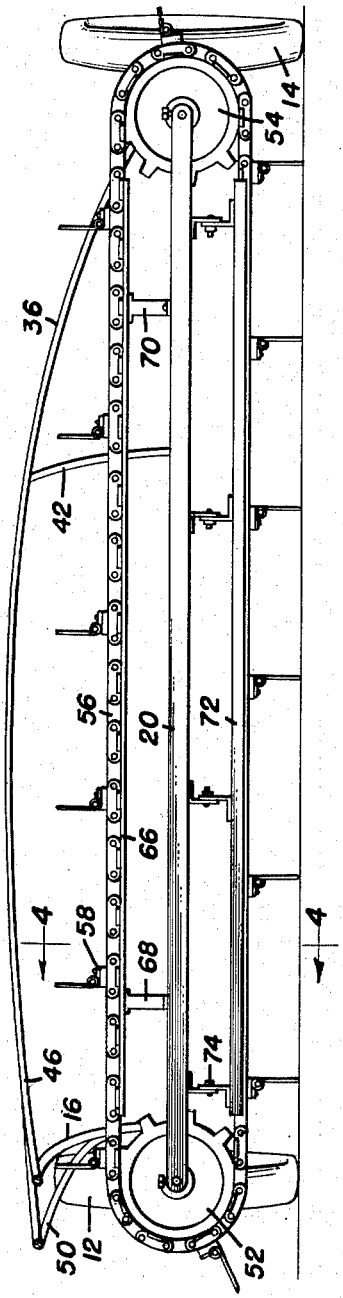
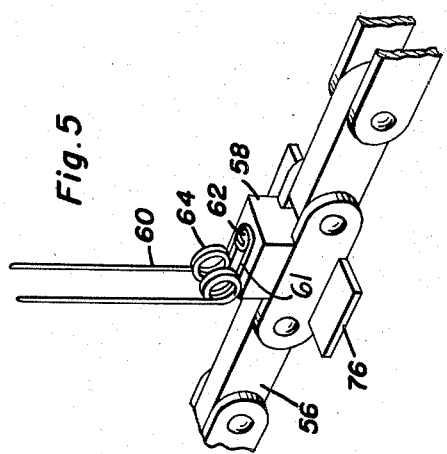
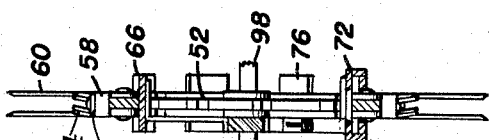
Julius D. Lambert
Esther M. Lambert
    INVENTORS.

United States Patent Office 2,699,639
Patented Jan. 18, 1955

---

2,699,639

SIDE DELIVERY HAY RAKE

Julius D. Lambert and Esther M. Lambert,
Burlington, Okla.

Application February 25, 1952, Serial No. 273,178

3 Claims. (Cl. 56—376)

This invention relates to a side delivery hay rake and particularly to a hay rake utilizing a diagonally mounted chain carrying rake tines for delivering a constant stream of hay into a windrow at one side of the rake.

In the harvesting of hay it is desirable to cut the hay and allow it to cure for a certain length of time in the field after which it is raked into windrows and transported to suitable storage. It is desirable to provide a raking device which will continuously rake the hay to one side or a so-called side delivery hay rake. Heretofore such side delivery hay rakes have been extremely complicated and have many wearing parts so that you have a complicated heavy machine to do a relatively light job.

The present invention provides a light frame having a guide mounted diagonally along the frame and a chain mounted for continuously moving hay carrying tines or rake elements along the frame so that hay is constantly picked up and delivered to one side of the rake.

In the construction according to the invention, the side delivery rake comprises a light rear axle extending transversely of the device and having ground engaging wheels at each end and a forwardly extending frame carrying a rake guide forwardly of the axle. The frame is supported by a front wheel which is preferably arranged in tandem relation with one of the wheels on the rear axle and the whole device is stiffened by arcuate frame members so that the rake remains laterally disposed in relation to the front or guide wheel.

It is accordingly an object of the invention to provide an improved type side delivery rake. It is a further object of this invention to provide a side delivery rake utilizing a diagonally mounted chain as a rake element.

It is a further object of this invention to provide a continuously moving diagonally mounted chain driven by a connection to the rear axle.

It is a further object of this invention to provide a guide element so that rake tines can be continuously moved in a vertical position.

It is a further object of this invention to provide a side delivery rake which can be mounted for use on uneven ground.

Other objects and many of the attendant advantages of this invention will be readily apparent from the following detailed description taken in conjunction with the accompanying drawings, in which:

Figure 1 is a top plan view of a hay rake constructed in accordance with the present invention;

Figure 2 is a cross section taken substantially on the plane indicated by the line 2—2 of Figure 1 and showing a rake guide and rake elements mounted thereon;

Figure 3 is a longitudinal section taken substantially on the plane indicated by the line 3—3 of Figure 1;

Figure 4 is an enlarged section through the rake structure and taken substantially on the plane indicated by the line 4—4 of Figure 2;

Figure 5 is an enlarged perspective view of the rake unit with parts broken away and, Figure 6 is a fragmentary view taken substantially on the plane indicated by the section line 6—6 of Figure 1 and showing the rack and pawl driving connection.

According to the exemplary embodiment of the invention, a transversely extending rear axle 10 is provided with ground engaging wheels 12 and 14 at the opposite ends thereof. As is usual with such devices, the wheels 12 and 14 are mounted in driving engagement with the axle 10 by means of suitable rack 11 and pawl 13 arrangement so that the wheels 12 and 14 may advance at different rates of speed without twisting the axle 10. Forwardly extending frame members 16 and 18 are journaled on the axle 10 by collars 17 and 38 and extend forwardly to mount a forwardly transversely extending guide bar 20 thereon. A front wheel 22 journaled on an axle 23 mounted in a frame 24 is swivelly mounted with respect to the arcuate frame member 16 by means of a swivel connection 26 so that the forward wheel 24 may oscillate with respect to the axle 10 so that the outer end of the axle 10 carrying the wheel 14 may raise or lower with respect to the wheel 24 without placing undue strain on the frame. A forwardly extending hitch member 28 having a clevis 30 attached to the frame 24 by means of a brace 32 so that the clevis 30 is then rigidly supported in front of the frame for attachment to any suitable drawing device, such as a tractor.

The transverse arcuate frame 36 extends from the journal 38 which supports the forwardly extending frame member 18 to the forward end of the member 16. A strengthening brace 40 is connected between the forwardly extending member 18 and the base of the brace 36 and the mid-brace 42 is secured to the arcuate brace 36 and has a journal 44 mounted intermediate the ends of the axle 10. Preferably the member 36 is bifurcated intermediate the ends thereof to provide ends 46 and 48 with the end 46 secured to the arcuate frame member 16, while end 28 extends over and is secured to the arcuate brace member 50. The forwardly extending frame members 16 and 18 together with the transverse brace 36 form a light rigid structure well adapted to support the guide bar 20. The guide bar 20 is provided with a sprocket wheel 52 and a sprocket wheel 54 at opposite ends thereof. An endless chain 56 is mounted on the sprocket wheels 52 and 54 and forms a continuous rake element therebetween. The rake tine supporting blocks 58 are mounted at intervals along the chain 56 and rake teeth are rigidly secured on the blocks 58. Preferably the rake teeth 60 are constructed of relatively large spring steel wire wound into a U-shape, the bight portion 65 of the U-shaped tooth 60 is preferably bent in angular relation to the teeth 60 and may be connected to the block 58 by means of a suitable fastener, such as a screw 62. In order to make the teeth sufficiently resilient, the teeth 60 are formed intermediate the ends thereof with a coil spring arrangement 64 so that if the teeth 60 come in contact with any fixed object, the teeth may readily spring thereover.

An upper guide track 66 is mounted on the guide bar 20 by means of brackets 68 and 70. The top flight of the chain 56 will then pass along the guide 66 so it may readily travel without becoming entangled or upset.

A lower guide way 72 is connected to the guide bar 20 by means of suitably extensible brackets 74. Preferably the guide way 12 is of substantially channel formation so that the chain 56 is rigidly supported against lateral displacement of the motion between the sprockets 52 and 54. In order to maintain the teeth 60 at substantially vertical arrangement with respect to the chain 56, guide flanges 76 have been mounted on the chain 56 and engage the guide way 72 to provide lateral support for the chain so that there will be no tendency to tilt the flange or teeth 60 out of vertical arrangement between the chain and the earth.

In order to drive the chain 56 a drive sprocket 80 is mounted on the shaft 10 adjacent one end thereof, preferably adjacent the end on which is mounted the longitudinal arcuate frame member 16 extending to the front wheel 22. An angulated reinforcing member 81 is rigidly secured in depending relation to the arcuate frame member 16. A depending bracket 82 is mounted on the arcuate frame member 16 and reinforcing member 81 by means of an elongated clamping plate 83 and tension fasteners, such as, bolts 85 with nuts 87 and depends therefrom and has a laterally extending portion 84 on which is mounted a gear box 86. A shaft 88 extends from the gear box 86 and has mounted thereon a sprocket 90. The drive chain 92 is entrained over the sprockets 80 and 90 so that the axle 10 drives the shaft 88 of the gear box 86. An output shaft 94 extends to the gear box 86 and has a sheave 96 mounted thereon. The sprocket 52 is provided with a thick shaft 98 which is mounted in a bearing 100 secured on the forwardly extending member 16 by a depending bracket 101 and rigidified by a brace member 103 secured to the reinforcing member 81. A sheave 102 is mounted on the end of the shaft 98 and a belt 104 is entrained over the sheave 102 so that the shaft 10 is in driving relation with the sprocket 52.

In the operation of the side delivery rake, the clevis 30 is attached to any suitable driving vehicle so that the triangular shaped frame is drawn after the vehicle. The wheels 12 and 14 impart rotary motion to the axle 10 which drives the drive sprocket 80 which drives the sprocket 88 through the drive chain 92. The output shaft of the gear box 86 is connected by means of the sheaves 96 and 102 to the shaft 98 of the sprocket 52 so that the sprocket 52 rotates as the vehicle moves over the ground.

The endless chain 56 is thereby caused to move over the upper guide way 66 and the guide flanges 76 will move through the channel-shaped member 72 so that the teeth 60 are in raking contact with the surface of the ground and will deliver any hay from the ground laterally of the machine so that a windrow will be formed outside of the wheel 14. The arcuate frame members being of relatively small size to insure sufficient strength to form a sturdy compact machine. The front wheel 22 is pivotally mounted with respect to the frame members so that the axle 10 may pivot about the swivel 26 to allow the wheel 14 to adjust to any unevenness or any quality of the ground.

It will thus be seen that the present invention provides a cheap practical side delivery rake which may be readily constructed of light material yet sturdy and useful.

The present invention is exemplified by a singular embodiment and has been described to the best present understanding thereof, however, it will be readily apparent to those skilled in the art that changes and modifications can be made therein without departing from the true spirit of the invention.

Having described the invention, what is claimed as new is:

1. A side delivery rake comprising a transversely extending axle, ground engaging wheels adjacent each end of said axle, said wheels being in driving engagement with said axle, a forwardly extending frame journaled on said axle, a support wheel mounted on said frame, a guide mounted on said frame, said guide extending in angular relation to said rear axle, sprocket wheels mounted at each end of said guide, an endless chain mounted on said sprocket wheels, rake teeth secured on said chain, a drive sprocket fixed on said rear axle, a driving connection between said drive sprocket and one of said sprocket wheels, said support wheel being swivel mounted on said frame, said frame being arched over one end of said guide.

2. A side delivery rake comprising a transversely extending axle, ground engaging driving wheels mounted in spaced apart relation on said axle, a longitudinally spaced supporting wheel, an arcuate frame extending from said axle to said wheel, said frame being located adjacent one end of said axle, a guide bar, one end of said guide bar being supported adjacent the end of said arcuate frame member, the other end of said guide bar being supported adjacent the end of the axle remote from said frame, upper and lower guide tracks mounted on said guide bar an endless rake chain mounted in said guide tracks, a driving connected between said shaft and said chain, an arcuate brace extending from said frame to said axle.

3. A side delivery rake comprising a transversely extending axle, ground engaging driving wheels mounted in spaced apart relation on said axle, a longitudinally spaced supporting wheel, an arcuate frame extending from said axle to said wheel, said frame being located adjacent one end of said axle, a guide bar, one end of said guide bar being supported from said arcuate frame member, the other end of said guide bar being supported adjacent the end of the axle remote from said frame, parallel guide tracks mounted on said guide bar, an endless rake chain mounted in said guide tracks, a driving connection between said shaft and said chain, an arcuate brace extending diagonally from said frame to said axle, said arcuate frame including a swivel about a longitudinally directed horizontal axis.

References Cited in the file of this patent
UNITED STATES PATENTS

| 2,494,946 | Ingram | Jan. 17, 1950 |

FOREIGN PATENTS

| 6,504 | Great Britain | 1900 |
| 20,246 | Great Britain | 1902 |
| 24,113 | Great Britain | 1902 |
| 20,831 | Great Britain | 1907 |